(12) United States Patent
Hilakari et al.

(10) Patent No.: US 8,262,341 B2
(45) Date of Patent: Sep. 11, 2012

(54) TURBINE PART OF A TURBOCOMPRESSOR AND A METHOD OF AVOIDING CARBON BUILD-UP IN THE TURBINE PART OF A TURBOCOMPRESSOR

(75) Inventors: Vesa Hilakari, Piikkiö (FI); Tero Raikio, Vaasa (FI)

(73) Assignee: Wärtsilä Finland Oy, Vaasa (FI)

( * ) Notice: Subject to any disclaimer, the term of this patent is extended or adjusted under 35 U.S.C. 154(b) by 1282 days.

(21) Appl. No.: 11/917,237

(22) PCT Filed: May 15, 2006

(86) PCT No.: PCT/FI2006/050195
§ 371 (c)(1),
(2), (4) Date: Jan. 9, 2008

(87) PCT Pub. No.: WO2006/134222
PCT Pub. Date: Dec. 21, 2006

(65) Prior Publication Data
US 2008/0219842 A1   Sep. 11, 2008

(30) Foreign Application Priority Data
Jun. 14, 2005   (FI) ..................................... 20055308

(51) Int. Cl.
*F04D 29/40* (2006.01)
(52) U.S. Cl. ...................................... 415/115; 416/96 R

(58) Field of Classification Search ................... 415/115, 415/116, 117, 121.2, 201; 416/90 R, 96 R, 416/97 R
See application file for complete search history.

(56) References Cited

U.S. PATENT DOCUMENTS

| 4,548,040 | A | 10/1985 | Miller et al. |
| 5,938,402 | A | 8/1999 | Bochud et al. |
| 2003/0035945 | A1 | 2/2003 | Strangman et al. |

FOREIGN PATENT DOCUMENTS

| EP | 0781897 | 7/1997 |
| EP | 0848150 | 6/1998 |
| EP | 1388656 | 2/2004 |
| EP | 0924382 | 1/2005 |
| GB | 2408779 | 6/2005 |
| JP | 58085371 | 5/1983 |
| JP | 58077103 | 10/1983 |
| JP | 59000503 | 1/1984 |
| JP | 60069214 | 4/1985 |
| JP | 62237040 | 10/1987 |
| JP | 03121202 | 5/1991 |
| JP | 11082038 A | 3/1999 |
| WO | 9734075 | 9/1997 |

*Primary Examiner* — Dwayne J White
(74) *Attorney, Agent, or Firm* — Chernoff, Vilhauer, McClung & Stenzel

(57) ABSTRACT

A turbine unit of a turbocompressor comprises a turbine wheel having blades and a flow channel for directing exhaust gas onto the turbine wheel. The turbine unit additionally comprises injection means for injecting carbon build-up preventing substance into the flow channel.

5 Claims, 5 Drawing Sheets

TURBINE PART OF A TURBOCOMPRESSOR AND A METHOD OF AVOIDING CARBON BUILD-UP IN THE TURBINE PART OF A TURBOCOMPRESSOR

CROSS-REFERENCE TO RELATED APPLICATIONS

This is a national stage application filed under 35 USC 371 based on International Application No. PCT/FI2006/050195 filed May 15, 2006, and claims priority under 35 USC 119 of Finnish Patent Application No. 20055308 filed Jun. 14, 1005.

BACKGROUND OF THE INVENTION

The invention relates to a turbine part of a turbocompressor.

The invention also relates to a method of preventing carbon build-up in the turbine part of a turbocompressor.

In engine technology it is known to use turbocompressors for increasing engine power. A turbocompressor comprises a compressor part by means of which pressurized combustion air is fed to the engine. A turbocompressor further comprises a turbine part that runs the compressor. The exhaust gases from the engine are directed to the turbine that transforms the energy of the exhaust gases into compressor drive power. The exhaust gases from the engine are hot, whereby solutions have been provided for cooling the turbine unit. Cooling the turbine unit, however, decreases the temperature of the exhaust gases, which limits their utilization in a number of applications. Utilizing cooled exhaust gases in, for example, a waste-heat boiler is problematic, as the temperature of the steam produced or the heated water can not always be sufficiently increased. In addition, a large-scale cooling system makes the apparatus more complicated and increases its production costs. Because of this, uncooled turbocompressor devices are used in a number of applications.

It has, however, been observed that in some conditions carbon tends to build up in uncooled turbocompressors. The carbon build-up is common especially when heavy fuel oil is used as fuel. The temperature of the turbine surfaces in contact with the exhaust gas increases to a high level, whereby the carbon forming on the surfaces is especially hard. The carbon build-up is especially problematic in the area between the tips of the turbine blades and the flow channel surrounding them.

The properties of the carbon deposit vary according to the composition of the fuel; with vanadium- and sodium-containing heavy fuel oils the problem is especially considerable.

It is an object of the present invention to reduce the carbon build-up of the turbine part of a turbocompressor.

SUMMARY OF THE INVENTION

The invention is based on the injecting carbon build-up preventing substance into the flow channel of the turbine part of the turbocompressor. For example steam, water, air and/or another suitable gas can be used as the carbon build-up preventing substance.

Considerable advantages can be achieved by means of the invention.

Carbon build-up on the surfaces of the turbine part of the turbocompressor being in contact with the exhaust gas is reduced, whereby maintenance requirements are reduced and efficiency remains higher. The amount of the carbon build-up preventing substance can be kept small in relation to the mass flow of the exhaust gas, whereby the temperature of the exhaust gas hardly changes. Further, the injection of the carbon build-up preventing substance can be arranged rather simply and inexpensively in connection with the turbine part.

In one embodiment of the invention steam is used as carbon build-up preventing substance. Steam forms a layer on all surfaces in contact with the exhaust gas, the layer both preventing carbon build-up and effectively removing carbon formed on the surfaces.

BRIEF DESCRIPTION OF THE DRAWINGS

In the following the invention is described in more detail by means of examples according to the appended drawings.

DETAILED DESCRIPTION

Figure 1:
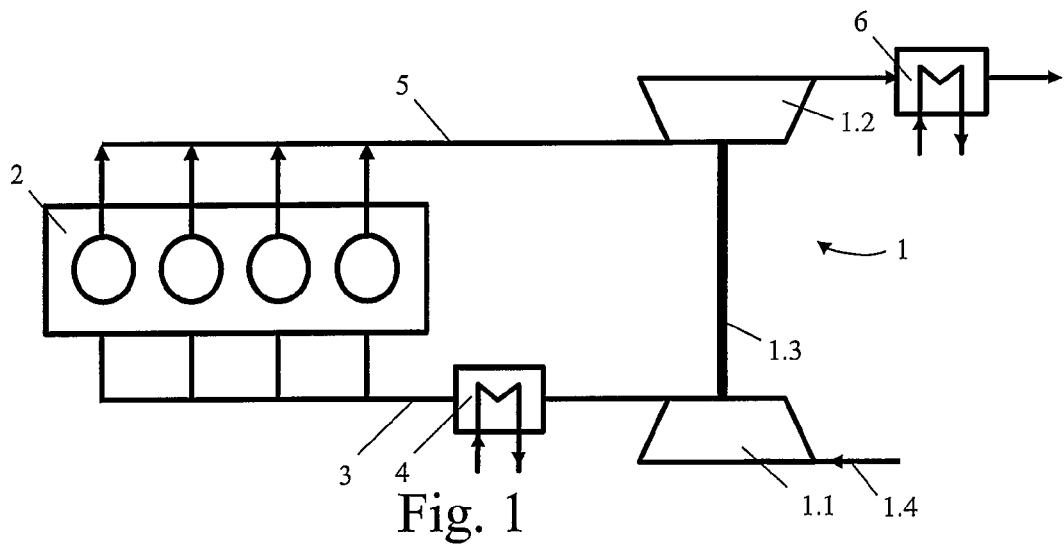
FIG. 1 is a schematical illustration of a turbocompressor in connection with a piston engine.

In FIG. 1 the turbocompressor 1 is arranged in connection with the piston engine 2. The turbocompressor comprises a compressor unit 1.1 and a turbine unit 1.2. These are connected to each other by means of a drive shaft 1.3. The turbocompressor arrangement is connected to the piston engine 2 via an air inlet channel 3, connected to the high-pressure side of the compressor unit 1.1. A heat exchanger 4 is arranged in connection with the feed channel 3 for cooling the air prior to introducing it into the piston engine 2. The turbine unit 1.2 of the turbocompressor 1 is connected to the piston engine 2 via the exhaust gas channel 5.

When running the engine 2, air is introduced into the compressor unit 1.1 via intake channel 1.4. The compressor unit 1.1 increases the air temperature and pressure and feeds air to the engine 2 via inlet channel 3. In the engine 2 air is used for combusting the fuel, and the exhaust gases formed in combustion are introduced into the flow channel 1.5 of the turbine unit 1.2 via exhaust gas channel 5. In the turbine unit 1.2 the exhaust produces work for running the compressor 1.1 unit. From the turbine unit 1.2 the exhaust gases are further directed into an exhaust gas boiler 6, in which the heat energy contained by the exhaust gases is used for steam production and/or heating the water. In use with internal combustion engines the exhaust gas arriving to the turbine unit 1.2 is typically about 550° C. and about 350° C. subsequent to the turbine unit.

Figure 2:
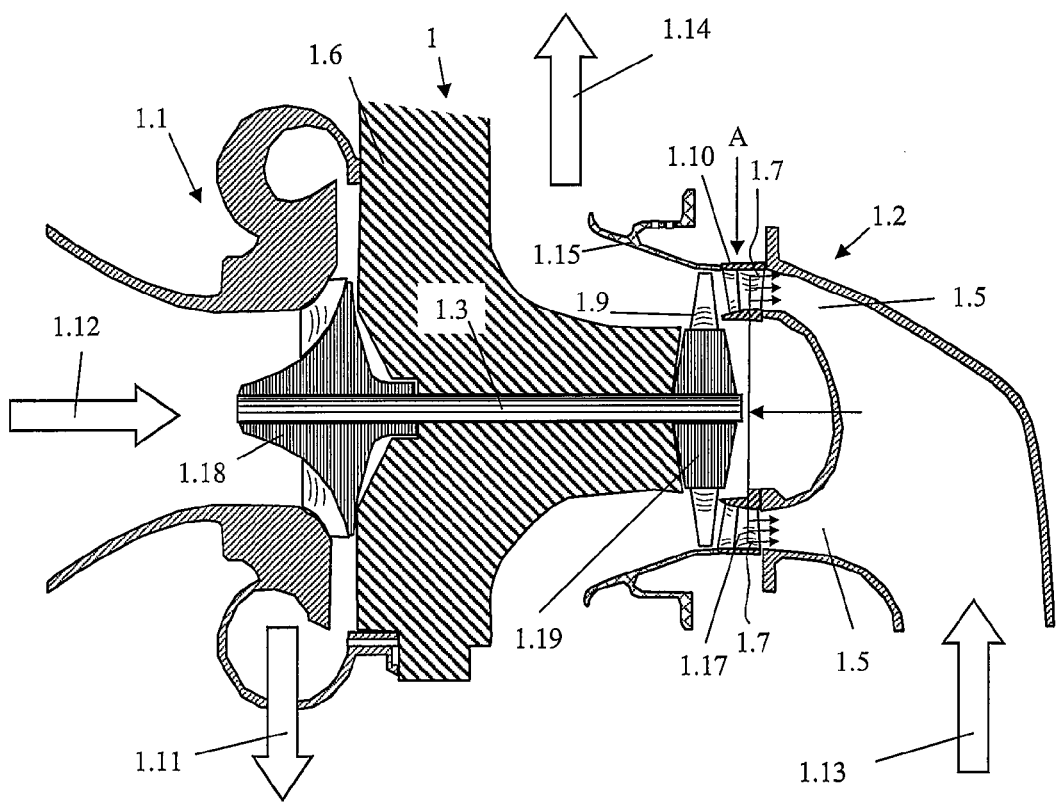
FIG. 2 is a cross-sectional illustration of a turbocompressor provided with a turbine part according to the invention.

FIG. 2 illustrates in closer detail a turbocompressor that can be used in an arrangement shown in FIG. 1. Here, the compressor unit 1.1 and the turbine unit 1.2 are connected to each other via a bearing body 1.6. A drive shaft 1.3 is bearing-mounted on the bearing body 1.6. A turbine wheel 1.19 having blades 1.9 is attached to one end of the shaft and a compressor wheel having blades is attached to the other end of the shaft. The flow direction of the air flowing from the compressor unit 1.1 to the engine 2 is marked by arrow 1.11 in FIG. 2 and the flow direction of the air arriving at the compressor unit 1.1 is marked by arrow 1.12. Accordingly, the flow direction of the exhaust gas arriving at the turbine unit 1.2 from the engine 2 is marked by arrow 1.13 and the flow direction of exhaust gas being directed from the turbine unit 1.2 to the exhaust gas boiler 6 is marked by arrow 1.14.

The exhaust gas from the engine 2 is directed into the flow channel 1.5 of the turbine unit 1.2. A nozzle ring 1.10 having vanes is arranged in the flow channel 1.5, the design of the nozzle ring being described in more detail in FIGS. 3 and 4. The nozzle ring 1.10 is rigidly attached to the walls of the flow channel 1.5. The exhaust gas arriving at the flow channel 1.5 first flows through the nozzle ring 1.10. The vanes 1.17 of the nozzle ring 1.10 change the flow direction of the exhaust gas so as to be suitable for the turbine blades 1.9 extending into the flow channel 1.5 and increase the flow speed of the exhaust gas. Subsequent to the nozzle ring 1.10 the exhaust gas flows to the blades of the turbine wheel 1.19. The exhaust gas impinges to the turbine blades 1.9 a circumferentially directed force, the force rotating the turbine wheel 1.19, the drive shaft 1.3 and the compressor wheel 1.18. From the turbine wheel 1.19 the exhaust gas flows into a diffusor 1.15 arranged in the flow channel, wherein its flow velocity is decreased and the pressure increased.

Heavy fuel oil, for example, can be used as fuel of the engine 2. Having vapourized and reacted with oxygen and possibly other substances in connection with the combustion, the fuel components form carbon on the surfaces of the turbine part 1.2. Carbon build-up is especially prominent when using heavy fuel oil as fuel. Carbon is especially detrimental in the area between the tips of the blades 1.9 of the turbine wheel 1.19 and the flow channel 1.5 surrounding them. Carbon formed in this area causes wear on the turbine blades 1.9 and reduces the cross-sectional flow area of the exhaust gas. On the other hand, the carbon formed on the surfaces of the vanes 1.17 of the nozzle ring 1.10 disturbs the flow of exhaust gas through the nozzle ring 1.10 and thus decreases the efficiency of the turbine and the power of the engine 2.

Figure 3:
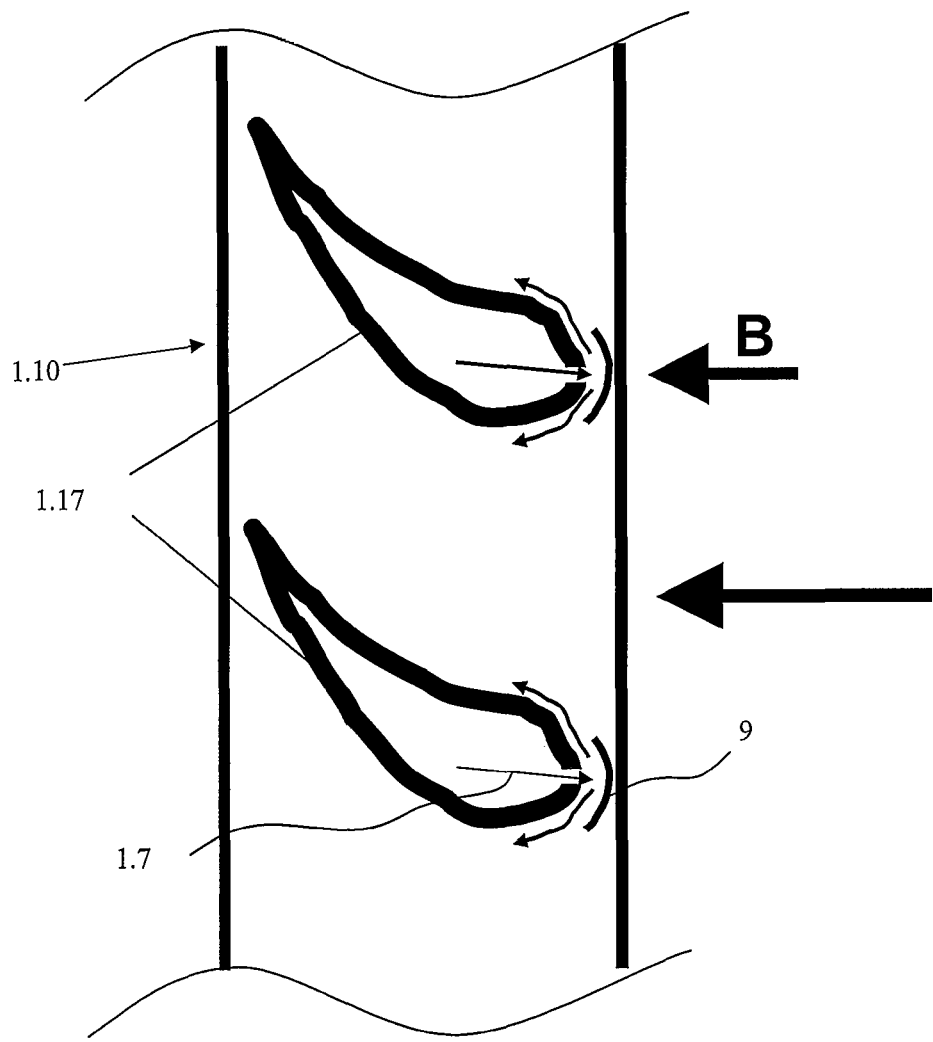
FIG. 3 is a partial enlargement of a nozzle ring of the turbocompressor of FIG. 2 as seen from the direction A.
Figure 4:
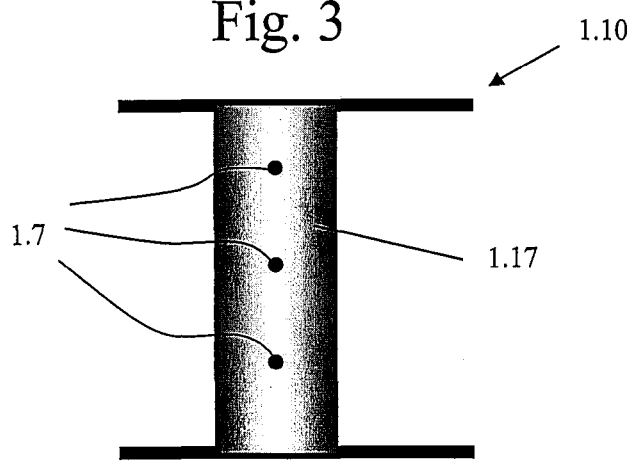
FIG. 4 illustrates the nozzle ring of FIG. 3 as seen from the direction B.

Carbon build-up on the surfaces of the nozzle ring 1.10 can be reduced by means of an arrangement shown in FIGS. 2-4. In the arrangement, channels 1.7 opening on the outer surfaces of the vanes 1.17 of the nozzle ring 1.10 are arranged in the nozzle ring 1.10. Steam is introduced into the channels 1.7, the steam being then discharged from the openings of the channels 1.7 and spreading on the surfaces of the vanes 1.17. One or more openings can be arranged in each vane 1.17 according to the size and shape of the vane. In an embodiment shown in FIGS. 2-4 each vane 1.17 has three openings. Usually each vane 1.17 is provided with at least one channel opening on the outer surface of the vane. Preferably the channel 1.7 opens on the front surface of the vane 1.17, i.e. on the surface opposite the flow direction of the exhaust gas, whereby the flow of exhaust gas spreads the steam injected from the opening to the sides of the vane 1.17. The spreading of the steam can be improved by means of a flow guide 9 arranged in front of the opening of the channel 1.7, at a distance from the opening. The surface of the flow guide 9 facing the opening is concave. The steam injected from the opening hits the flow guide 9, whereby the curved surface of the flow guide turns the flow direction of the steam towards the sides of the vane.

Steam is introduced into the channels 1.7 of the nozzle ring 1.10 by means of a channel arranged in the center of the nozzle ring or by means of a channel located in the casing 1.2 of the turbine part, outside the nozzle ring 1.10.

Figure 5:
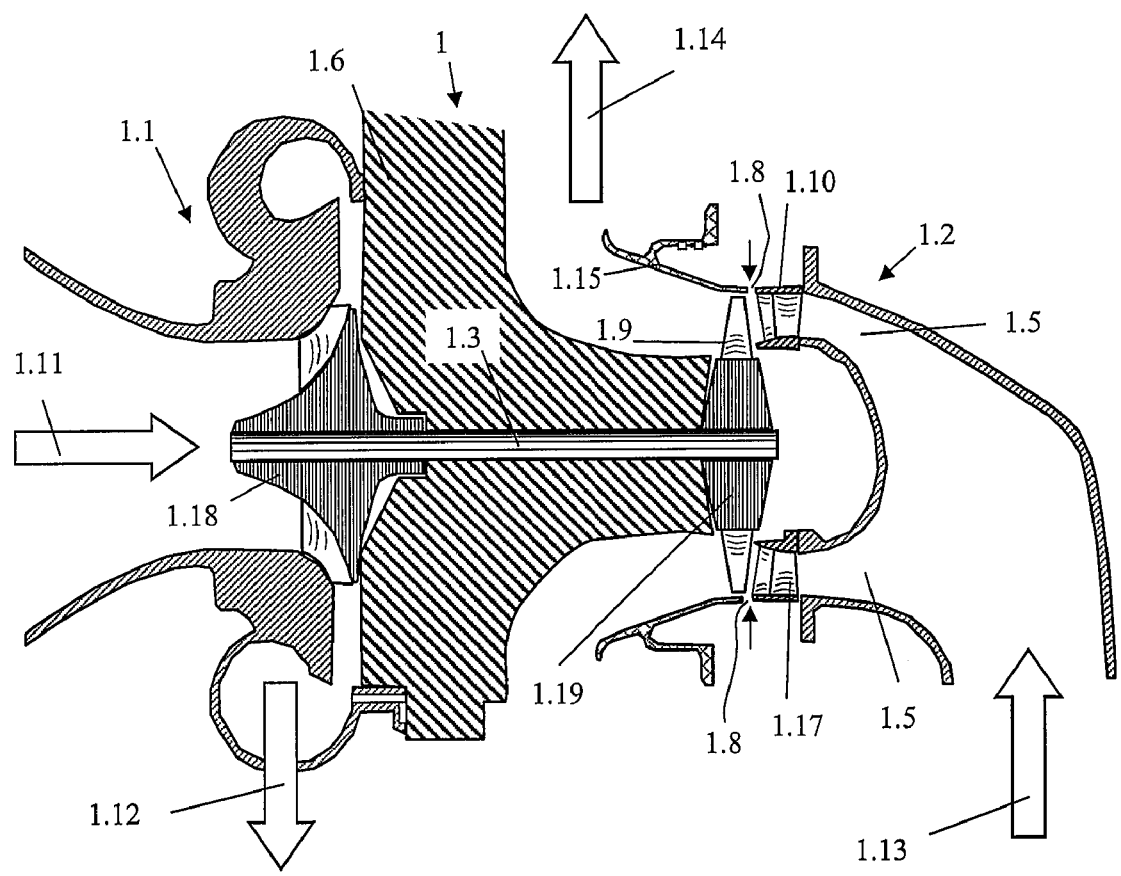
FIG. 5 is a cross-sectional illustration of a turbocompressor provided with a second turbine part according to the invention.

FIG. 5 illustrates another turbocompressor that can be used in the arrangement shown in FIG. 1. Here, the carbon build-up in the area between the tips of the blades 1.9 of the turbine part 1.2 and the flow channel 1.5 surrounding the blades is reduced by injecting steam into the flow channel 1.5. Steam is injected from openings 1.8 arranged on the circumference of the flow channel 1.5, the openings opening into the flow channel 1.5. The openings 1.8 are arranged suitably distributed along the circumference of the flow channel 1.5 so that they surround the circumference of the flow channel. Openings 1.8 are provided in the part of the flow channel 1.5 surrounding the tips of the turbine blades 1.9, i.e. in the so-called frame ring. Preferably, the openings 1.8 are located in the flow channel 1.5 at a place prior to the tips of the turbine blades 1.9 in the flow direction of the exhaust gas or at the area between the front and rear parts of the tips of the turbine blades 1.9. The steam injected from the openings 1.8 is spread by the influence of the exhaust gas flow onto the surface of the flow channel 1.5 at the area along the tips of the turbine blades 1.9 and forms a steam layer protecting from carbon build-up. The design and operation of the turbocompressor of FIG. 5 correspond to that of the turbocompressor of FIG. 2 with the exception of the steam feed arrangement.

Figure 6:
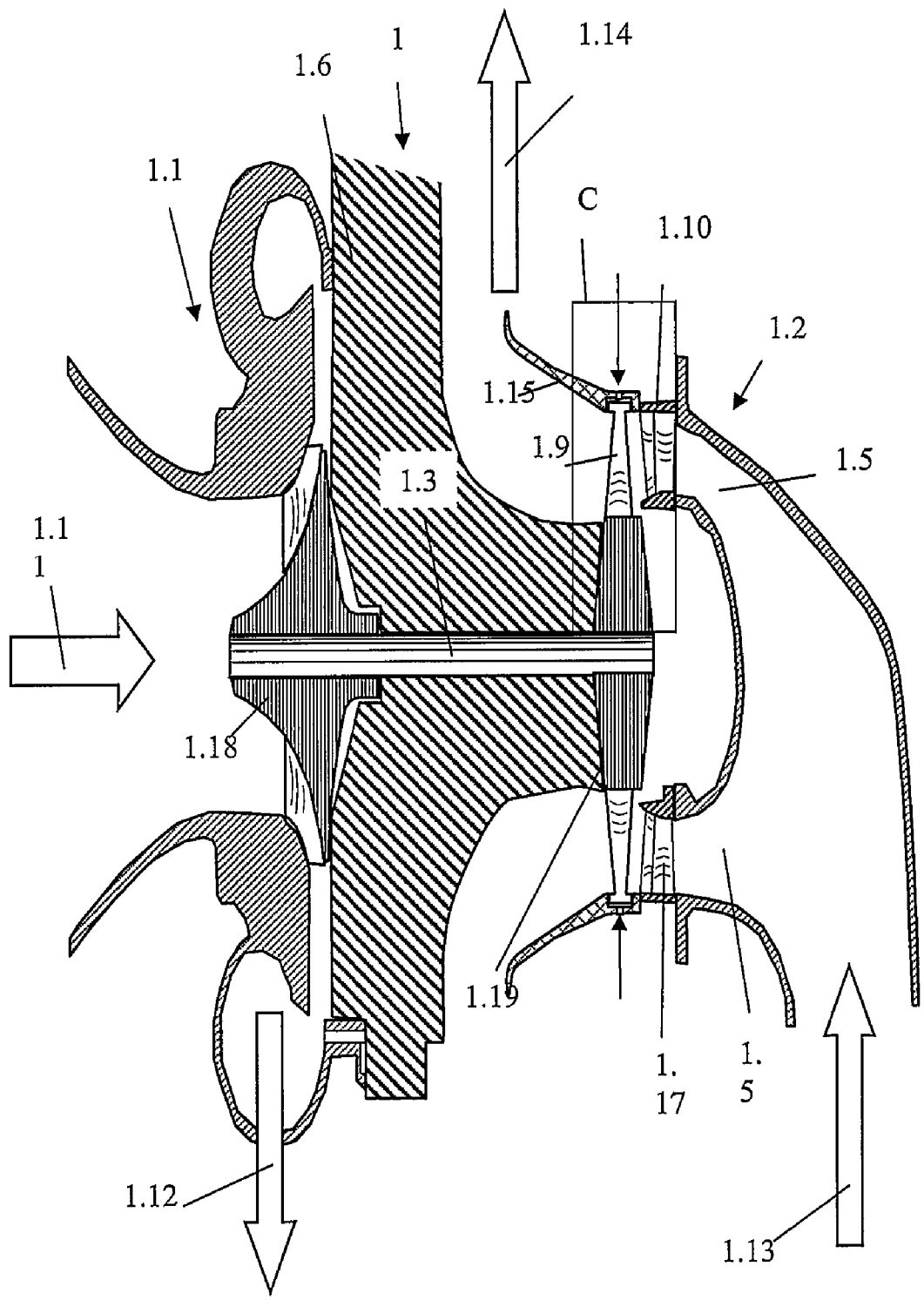
FIG. 6 is a cross-sectional illustration of a turbocompressor provided with a third turbine part according to the invention.
Figure 7:
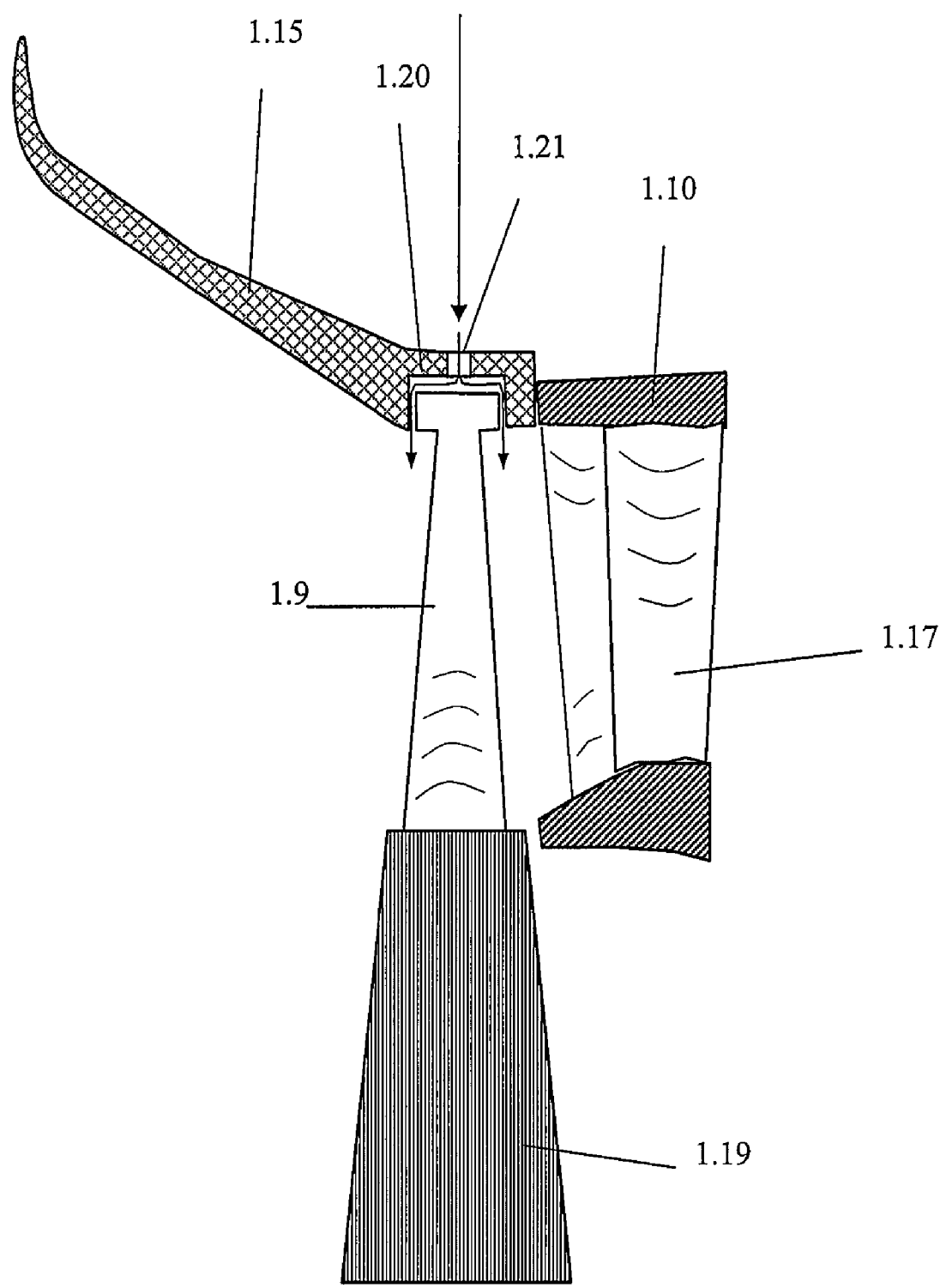
FIG. 7 illustrates, in partial enlargement, the point C of FIG. 6.

FIGS. 6 and 7 illustrate a third turbocompressor that can be used in an arrangement shown in FIG. 1. The circumference of the flow channel 1.5 is provided with a ring-like groove 1.20 into which the tips of the turbine blades 1.9 extend. Openings 1.21 are provided in the bottom of the groove 1.20, from which steam is injected towards the tips of the turbine blades 1.9. The steam fed from the openings 1.21 hits the turbine blades 1.9 and flows along the gap between the bottom of the groove 1.20 and the turbine blades 1.9 to the front and rear sides of the turbine blades 1.9.

In all above-described embodiments the purpose is to form a layer of steam preventing carbon build-up on the surfaces contacting the exhaust gas. The steam additionally removes carbon already deposited on the surfaces. In the embodiments of FIGS. 2-4 the layer protecting from carbon build-up is formed especially on the surfaces of the vanes 1.17 of the nozzle ring 1.10. In the embodiments illustrated in FIG. 5 and FIGS. 6 and 7 the steam layer is especially formed on the surface of the flow channel 1.5 surrounding the tips of the turbine blades 1.9. In all embodiments the steam feed point is arranged in the flow channel 1.5 at the area between the front part of the nozzle ring 1.10 and the rear part of the tips of the turbine blades 1.9. Steam is correspondingly injected into the flow channel 1.5 to the area between the front part of the nozzle ring 1.10 and the rear part of the tips of the turbine blades 1.9. Steam is conveyed to other surfaces of the turbine part 1.2, such as the surfaces of the diffusor 1.15 and the turbine blades 1.9, along with the flow of exhaust gas. Steam is produced, for example, in an exhaust gas boiler 6 of the engine 2 or in a separate steam producing apparatus. The temperature of the steam to be fed into the flow channel 1.5 is 100-250° C. Steam is continuously injected into the flow channel 1.5 during the operation of the turbocompressor 1.

The injection pressure of the steam must be higher than the exhaust gas pressure at the point of injection in order to avoid exhaust gas being conveyed into the channels 1.7, 1.8, 1.21. Typically the pressure of the steam injected into the flow channel 1.5 is 2-7 bar. The amount of steam to be injected into the flow channel 1.5 is chosen for each application by, for example, experimenting. The amount of steam to be injected depends on the composition and temperature of the exhaust gas and the temperature of the steam, for example. The amount of steam to be injected is adjusted, for example, by means of a regulating valve located at the feed line of the steam.

The invention also includes embodiments deviating from those discussed above.

The ways of injecting steam used in the above-mentioned embodiments can be combined, whereby steam is injected through both the inlet openings 1.7 of the nozzle ring 1.10 and the inlet openings on the circumference of the flow channel 1.5.

Instead of or in addition to steam, water, compressed air or other suitable gas can be used as the carbon build-up preventing substance. Compressed air can be introduced into the flow channel 1.5 from the high-pressure side of the compressor 1.1, whereby its pressure and temperature are usually suitable for this purpose.

The invention is not limited to the embodiments described here, but a number of modifications thereof can be conceived of within the scope of the appended claims.

The invention claimed is:

1. A turbine unit of a turbocompressor, the turbine unit comprising:
   a turbine wheel having blades, each blade having a tip, a means defining a flow passage for directing exhaust gas to the turbine wheel, the flow passage having a surface surrounding the tips of the turbine, blades, and
   an injection means for injecting carbon build-up preventing substance into the flow passage, the injection means defining channels opening into the flow passage at the surface surrounding the tips of the turbine blades in an area between front and rear parts of said tips.

2. A turbine unit according to claim 1, wherein the means defining the flow passage define an annular groove into which turbine blades of the turbine wheel extend, and the channels open into the annular groove.

3. A method of operating a turbine unit of a turbocompressor, the turbine unit comprising a turbine wheel having blades and a means defining a flow passage for directing exhaust gas onto the turbine wheel, said method comprising injecting carbon build-up preventing substance into the flow passage through channels that open into the flow passage at a surface surrounding tips of the turbine blades in an area between front and rear parts of said tips.

4. A method according to claim 3, wherein the means defining the flow passage defines an annular groove into which the turbine blades of the turbine wheel extend and the method comprises injecting the substance preventing formation of carbon build-up into the groove.

5. A method according to claim 3, comprising injecting water vapor as the carbon build-up preventing substance.

* * * * *